No. 737,272. PATENTED AUG. 25, 1903.
J. M. RETTIG.
CULTIVATOR.
APPLICATION FILED MAY 13, 1903.
NO MODEL.

Witnesses
E. F. Stewart
C. N. Woodward

John M. Rettig, Inventor
by C. A. Snow & Co.
Attorneys

No. 737,272. Patented August 25, 1903.

UNITED STATES PATENT OFFICE.

JOHN MICHAEL RETTIG, OF CHANUTE, KANSAS.

CULTIVATOR.

SPECIFICATION forming part of Letters Patent No. 737,272, dated August 25, 1903.

Application filed May 13, 1903. Serial No. 156,993. (No model.)

*To all whom it may concern:*

Be it known that I, JOHN MICHAEL RETTIG, a citizen of the United States, residing at Chanute, in the county of Neosho and State of Kansas, have invented a new and useful Cultivator, of which the following is a specification.

This invention relates to cultivators which may be employed more particularly in contracted localities where the manner of planting or the sizes of the plants will not permit the larger sizes of "straddle-row" cultivators, and has for its object to simplify and improve devices of this character and produce an implement which may be employed to advantage between the rows of growing plants which are too large to permit the passage of ordinary cultivators.

The invention consists in certain novel features of construction, as hereinafter shown and described, and specified in the claims following.

Figure 1:
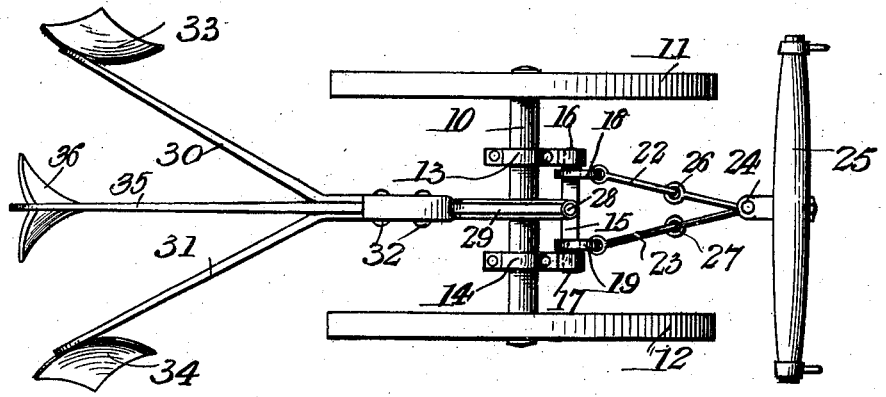
Figure 2:
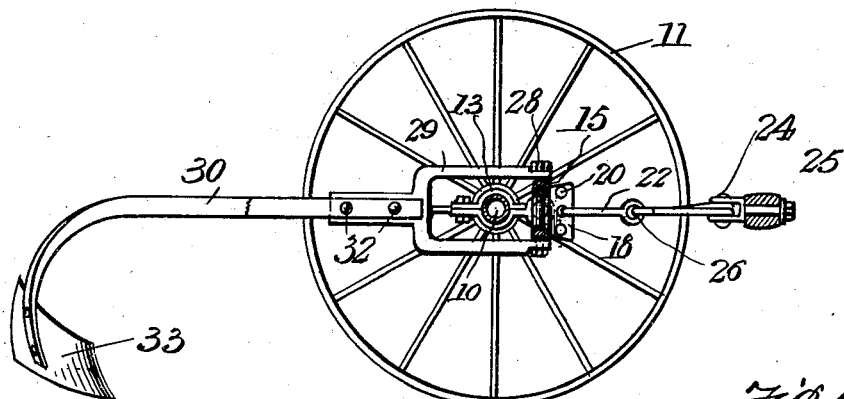
Figure 3:
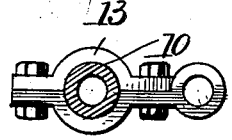
Figure 4:
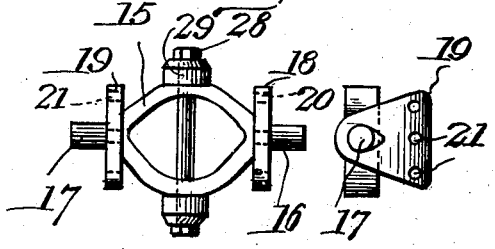

In the drawings illustrative of the invention, in which corresponding parts are denoted by like designating characters, Figure 1 is a plan view of the device complete, and Fig. 2 is a side elevation. Fig. 3 is an enlarged detail of the axle-clamp. Fig. 4 represents the rocking frame, enlarged.

In cultivating corn after it has grown too large for the employment of ordinary straddle-row cultivators the cultivation has to be conducted between the rows, and the same necessity may arise in connection with other crops, and the cultivators of the class to do this require also that one horse only shall be employed, owing to the contracted space in which the implement must be used. To produce an implement of this class which may be successfully employed in such confined localities and at the same time perform the work fully as satisfactorily as the larger implements, is the principal object of the present invention, which consists of an axle 10, having the supporting-wheels 11 12 and spaced a relatively short distance apart, as shown. Ordinarily the extreme width of the implement should not exceed two feet. Hence the distance apart of the wheels should not exceed these dimensions.

Attached to the axle are bearings 13 14, spaced equidistant from the center and preferably connected detachably thereto as by clips and bolts, so that they may be readily attached and detached or adjusted, as required. The bearings 13 14 extend forwardly of the axle and form means for supporting a frame 15, the latter having journals 16 17 engaging the bearings to provide for the free oscillation of the frame, as will be obvious. At its ends the frame 15 is provided with vertical forwardly-extending wings or plates 18 19, having spaced apertures 20 21, respectively, as shown, and movably coupled in one of the apertures of each wing are draft-links 22 23, the links converging toward the swingletree 25 and pivotally connected at 24 to a plate 24', extending rearwardly from the swingletree. The draft-links are made flexible by the provision of intermediate coupling-eyes 26 27, so that they will double together or "buckle" when the strain is removed for a purpose hereinafter explained.

The frame 15 extends above and below the line of the axle 10, as shown, and connected centrally thereto by a pivot-bolt 28 is a yoke-frame 29, the latter embracing the axle from the rear and having diverging cultivator-beams 30 31 connected to its rear side, as by bolts 32.

The cultivator-blades are indicated at 33 34 and will be reversely connected to the beams in the usual manner, so as to throw the earth outwardly at each side.

The beams 30 31 will be of the usual construction, and the blades 33 34 will be connected thereto by any of the ordinary coupling means in common use, and I do not, therefore, wish to be limited to any specific construction of this portion of the implement, but reserve the right to adapt any suitable form of cultivator-blades and attach them in any suitable manner to the beams. I also claim the right to employ interchangeable cultivator-blades of various forms for cultivating various kinds of crops and of crops at various stages of growth, as these changes and modifications will not be a departure from the principle of the invention.

An implement of this construction, it will be obvious, may be drawn through the relatively narrow spaces between the rows of corn or other plants and efficiently cultivate the soil and throw it to either side around the roots of the plants, the cultivator beams and blades "trailing" accurately after the draft-animal by reason of the peculiar and novel connection between the axle and swingletree, as the draft-links serve as an "evener" to cause the axle and its attachments to follow directly in rear of the draft-animal. At the ends of the rows as the animal is turned to enter the next space between the next rows the draft-link toward the side to which the animal turns "buckles" at the intermediate joint and throws the whole draft on the other link, causing the supporting-wheels to be turned straight before the cultivator starts. Thus the cultivator will follow the horse, no matter which way he is turned, and travel as straight as any two-horse cultivator. By reason of the oscillation of the frame 15 in its bearings 13 14 and the yoke-frame 29 on its pin 28 the beams are free to swing both vertically and horizontally and readily adapt themselves to any unevenness in the soil.

The vertical plates 18 19, having the spaced apertures 20 21, in which the draft-links may be adjusted vertically, provide for the regulation of the depth to which the cultivator-blades shall cut, as it will be obvious that if the draft-links be connected to the upper apertures the cultivator-beams will be depressed and when connected in the lower apertures the beams will be elevated. This is an important feature of the invention and adds materially to the value and efficiency thereof.

The parts will be formed of malleable iron or steel of ample strength to withstand the strains to which they will be subjected and may be modified in minor particulars without departing from the principle of the invention or sacrificing any of its advantages.

A third or central beam 35 may be bolted to yoke 29 between the beams 30 31 and extended rearwardly and provided with double side blades, as at 36, to sever the weeds and throw the earth in opposite directions, and thus insure the proper and complete cultivation of the soil the full width between the rows. This third beam will be found very useful and convenient in operating upon some kinds of soil and in connection with some kinds of crops.

Having thus described the invention, what I claim is—

1. The combination of an axle having spaced supporting-wheels, a frame movably coupled to said axle and rotative parallel thereto, a swingletree, draft-links connecting the spaced ends of said frame with the central point of said swingletree, diverging beams movably connected centrally to said oscillating frame and swinging laterally thereon, and carrying reversely-disposed cultivator-blades at their free ends, substantially as specified.

2. The combination of an axle having spaced supporting-wheels, spaced bearings connected to said axle, an oscillating frame supported in said bearings, a swingletree, links movably connecting the ends of said oscillating frame centrally to said swingletree, a yoke-frame coupled centrally of said frame and swinging laterally thereon, and diverging beams extending from said yoke-frame and carrying reversely-disposed cultivator-blades, substantially as specified.

3. The combination of an axle having spaced supporting-wheels, a frame movably coupled to said axle and rotative parallel thereto, a swingletree, draft-links formed of movably-coupled rods and connecting the spaced ends of said frame with a central point of said swingletree, diverging beams movably connected centrally to said oscillating frame and swinging laterally thereon, and carrying reversely-disposed cultivator-blades at their free ends, substantially as specified.

4. The combination of an axle having spaced supporting-wheels, spaced bearings connected to said axle, a frame supported for oscillation by said bearings and provided with vertical spaced wings having a plurality of spaced apertures, a swingletree, links movably connected at one end centrally to said swingletree and with their other ends connected detachably in said apertures, diverging beams movably coupled centrally to said frame and swinging laterally thereon, and reversely-disposed cultivator-blades upon the free ends of said beams, substantially as specified.

5. The combination of an axle having spaced supporting-wheels, spaced bearings connected to said axle and extending forwardly thereof, a frame supported for oscillation in said bearings and extending above and below said axle, a swingletree, draft-links connecting said oscillating frame near its ends to the central point of said swingletree, a yoke-frame embracing said axle from the rear and movably coupled centrally to said oscillating frame, diverging beams extending from said yoke-frame, and cultivator-blades reversely disposed and connected to said beams, substantially as specified.

In testimony that I claim the foregoing as my own I have hereto affixed my signature in the presence of two witnesses.

JOHN MICHAEL RETTIG.

Witnesses:
E. E. DOWELL,
FRANK WILSON.